United States Patent [19]

Salama et al.

[11] Patent Number: 4,728,224

[45] Date of Patent: Mar. 1, 1988

[54] ARAMID COMPOSITE WELL RISER FOR DEEP WATER OFFSHORE STRUCTURES

[75] Inventors: Mamdouh M. Salama, Ponca City, Okla.; John A. Mercier, London, England

[73] Assignee: Conoco Inc., Ponca City, Okla.

[21] Appl. No.: 856,322

[22] Filed: Apr. 28, 1986

Related U.S. Application Data

[63] Continuation-in-part of Ser. No. 631,127, Jul. 16, 1984, Pat. No. 4,589,801.

[51] Int. Cl.$^4$ ............................................. E02B 17/00
[52] U.S. Cl. ................................. 405/195; 166/367; 405/224
[58] Field of Search ................ 405/195, 224; 166/350, 166/359, 367; 156/173; 114/264, 265

[56] References Cited

U.S. PATENT DOCUMENTS 4,484,840  11/1984  Nandlal et al. ................ 405/195 X
4,589,801   5/1986  Salama ............................. 405/195 X Primary Examiner—Dennis L. Taylor
Attorney, Agent, or Firm—Richard K. Thomson

[57] ABSTRACT

Lightweight well riser elements for offshore platforms are formed of an aramid fiber/resin matrix material. The well risers are preferably in tubular form and include metallic end connectors for interconnecting a plurality of tubular members to form a well riser. Alternatively, the well riser may be formed in one piece extending for the entire length from a subsea template to the well deck on a floating platform.

14 Claims, 3 Drawing Figures

ARAMID COMPOSITE WELL RISER FOR DEEP WATER OFFSHORE STRUCTURES

This application is a continuation-in-part of application Ser. No. 631,127, filed July 16, 1984, now U.S. Pat. No. 4,589,801.

This invention relates to the art of floating offshore structures such as tension leg platforms and, more particularly, to a lightweight, moderately elastic well riser element.

BACKGROUND OF THE INVENTION

With the gradual depletion of subterranean and shallow subsea hydrocarbon reservoirs, the search for additional petroleum reserves is being extended to deeper and deeper waters on the outer continental shelves of the world. As such deeper reservoirs are discovered, increasingly complex and sophisticated production systems have been developed. It is projected that offshore exploration and production facilities will soon be required for probing depths of 6,000 feet or more. Since bottom founded structures are generally limited to water depths of no more than about 1,500 feet by current technology and because of the sheer size of the structure required, other so-called compliant strutures have been developed.

One type of compliant structure receiving considerable attention is a tension leg platform. (TLP). A TLP generally comprises a semisubmersible-type floating platform anchored by piled foundations through vertically oriented members or mooring elements called tension legs. The tension legs are maintained in tension at all times by insuring that the buoyancy of the TLP exceeds its operating weight under all environmental conditions. The TLP is compliantly restrained in the lateral directions allowing limited sway, surge and yaw while vertical plane movements of heave, pitch and roll are stiffly restrained by the tension legs.

Current TLP designs utilize heavy walled steel tubulars for the mooring elements. These tension legs constitute a significant weight with respect to the floating platform, a weight which must be overcome by the buoyancy of the floating structure. For instance, the tension legs utilized on the world's first commercial TLP which was installed in the Hutton Field of the United Kingdom North Sea in 485 feet of water comprised steel tubulars have an outer diameter of 10.5 inches and an inner bore of 3.0 inches. It should be readily apparent that, with increasingly long mooring elements being required for a tension leg platform in deeper and deeper waters, floating structures having the necessary buoyancy to support the extra weight of such mooring elements must be increasingly larger and more costly. Further, the handling equipment for installing and retrieving the long, heavy tension legs adds excessive weight and complexity to a tension leg platform system. Flotation systems can be utilized but are generally very costly and their reliability is questionable. In addition, the increased size of a flotation module can result in an increase in the hydrodynamic forces on the structure.

In an effort to lower the weight of deep water tension legs while retaining the strength of the heavy steel tubulars, it has been proposed that high modulus composite structures of carbon fiber be employed.

Another means for reducing the weight and complexity of a TLP, particularly in deep water applications would be to simplify and lighten the well riser system. The use of tubular steel risers for deep water development requires complicated and expensive tensioning and motion compensation equipment. In order to maintain compatable riser profiles for the prevention of hydrodynamic interaction and contact between a multiplicity of adjacent risers, the top tension applied to each of the risers must be significantly greater than the riser weight. This not only requires the use of expensive tensioning equipment as the weight of the risers increases with increasing depth, it also leads to an increase in the required platform displacement.

One approach for reducing the apparent weight of the risers would be to add syntactic foam floatation modules. However, flotation modules are costly and markedly increase the overall diameter of the riser assembly resulting in larger hydrodynamic forces which must be compensated for in the tensioning and motion compensation system. Furthermore, flotation modules require large distances to be provided between adjacent risers to prevent interaction thereby leading to an increase in the required well deck area of the platform.

Steel risers require an expensive and complicated motion, compensation system to reduce the fluctuating riser loads due to wave action and platform movement. Such apparatus must also compensate for temperature and pressure effects which reduce the pretension on the riser in use.

SUMMARY OF THE INVENTION

The present invention provides a riser having low axial stiffness and light weight and which allows the well heads to be fixed at deck level without the need for motion compensation equipment.

In accordance with the invention, a well riser for a floating offshore platform comprises a tubular composite structure having a plurality of substantially longitudinally oriented aramid fibers having an elastic modulus of less than about twenty million psi embedded in a resin matrix.

Further in accordance with the invention, circumferentially oriented fibers of lower elastic modulus are used on the above-described composite tubular to optimize its hoop strength.

It is therefore an object of this invention to provide a lightweight well riser tubular with low axial stiffness due to tension which eliminates this necessity for motion compensation equipment but which has ultra high axial stiffness to resist the effects of temperature and pressure.

It is a further object of this invention to provide a lightweight composite tubular for use as a well riser which offers substantial damage resistance through the use of aramid fibers.

It is yet another object of this invention to provide a composite well riser tubular which eliminates the need for tapered flex joints at its fixed ends.

BRIEF DESCRIPTION OF THE DRAWINGS

The instant invention will now be further described and illustrated through a description of a preferred embodiment thereof and which is illustrated in the accompanying drawings forming a part of this specification and in which.

DETAILED DESCRIPTION OF THE PREFERRED EMBODIMENTS AND THE DRAWINGS

Figure 1:
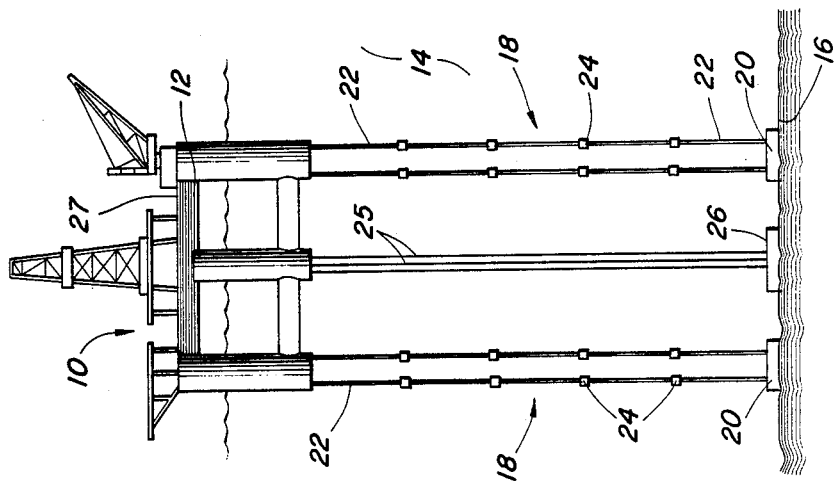
FIG. 1 is a schematic view of a tension leg platform in which the riser elements in accordance with this invention may be used.

Referring now to the drawings wherein the several figures are presented for illustrating a preferred embodiment of the invention only and not for the purpose of limiting the scope of the invention, FIG. 1 shows an offshore tension leg platform 10. The TLP 10 generally comprises a platform 12 floating in a body of water 14 and which is anchored to the bottom 16 of the body of water by a plurality of tensioned mooring elements 18 which extend between the floating platform 12 and anchoring means 20 which are located on the bottom 16 of the body of water 14. The anchoring means 20 are adapted for connection of a plurality of tensioned mooring elements 18 and are secured in position by plurality of pilings extending into the bottom 16.

The tensioned mooring elements 18 comprise a plurality of tubular joints 22 which are interconnected at their ends by a plurality of connector means 24. The tensioned mooring elements 18 are maintained in constant tension between the anchoring means 20 and the floating platform 12 by buoyancy of the floating platform 12 which is constantly maintained in excess of its operating weight under all conditions.

The tension leg platform 10 also includes a plurality of well risers 25 extending from a subsea template 26 to a well deck 27 located on the floating platform structure 12. In normal TLP operations, the well risers 25 are each provided with some form of motion compensation in order to maintain tension on the well risers 25 and prevent compression buckling thereof due to platform motions. In the past, such well risers 25 have been made of tubular steel and the riser tensioners generally comprising a complex system of hydraulic cylinders have a piston stroke long enough to accomodate any platform motions while maintaining the required tension on the well risers 25.

The present invention provides a means for replacing the common tubular steel well risers with a tubular composite having low axial stiffness which, by its somewhat elastic nature, permits direct connection of the well risers 25 to wellheads secured to the well deck 27 and permitting the elimination of large heavy, complex, and costly riser tensioning devices. In accordance with a preferred embodiment of the invention, the well risers 25 comprise a tubular composite of a plurality of substantially vertically oriented aramid fibers in a resin matrix.

Figure 3:
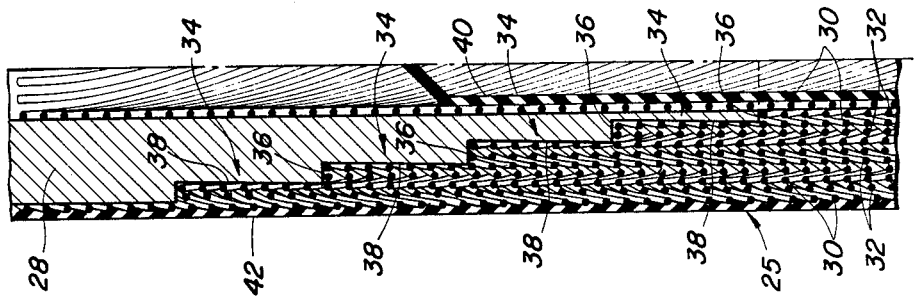
FIG. 3 is a cross-sectional view of the composite riser shown in FIG. 2 taken along lines 3—3 thereof.
Figure 2:
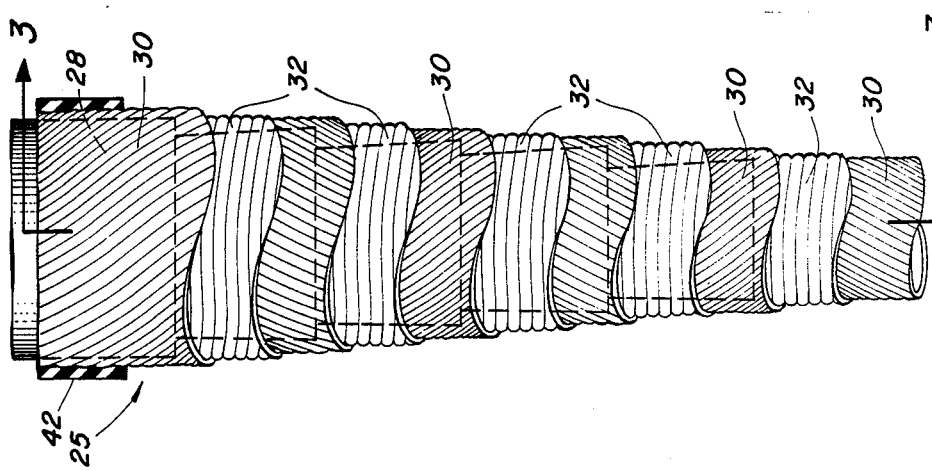
FIG. 2 is an elevational view in partial section of the composite riser element of the present invention showing various layers of composite material.

As shown in FIGS. 2 and 3, in accordance with one preferred embodiment of the invention, a well riser 25 generally comprises a tubular composite structure including a metallic connector 28 disposed at each end thereof. Alternatively, integral connectors may be provided. The well riser 25 may be a one piece structure extending the entire length between the template 26 and the well deck 27. Alternatively, the well riser 25 may comprise a plurality of interconnected joints utilizing metallic connectors 28 which may have a threaded design or be welded together in order to form a continuous tubular riser 25.

In accordance with the invention, the composite tubular well riser 25 comprises a plurality of layers of generally longitudinally (small helix angle) extending reinforcing fibrous material. In its preferred form, a plurality of parallel-lay aramid fiber layers 30 have an elastic of less than about twenty million psi. The fibers are disposed in a thermoset or thermoplastic matrix. The longitudinal fiber layers 30 are alternated with circumferentially wound layers 32 of high strength, high twist angle, helically wound aramid fibers having an elastic modulus less than that of the longitudinal fibers 30 in the same resin matrix. Proper selection of longitudinal and circumferential fiber materials can insure that the length of the riser is independent of internal pressure and fluid temperature effects. It will be understood that the well riser 25 may be constructed solely of aramid fibers in a resin matrix in two-layer sets, with one set of parallel-lay or a longitudinally oriented low-angle helical twist layers and the other set with layers of circumferentially wound aramid fiber. The circumferential winding 32 is present order to provide the hoop strength, toughness and damage resistance to composite structure. In its preferred form, the aramid fibers have an elastic modulus of less than about twenty million psi.

In the cross-sectional view of the well riser 25 shown in FIGS. 2 and 3, the layered form of the tubular composite structure and one preferred form of metallic connector 28 are shown. As can be seen, a plurality of layers of longitudinally oriented aramid fibers 30 are alternated with a plurality of circumferentially oriented aramid fibers 32 all in a resin matrix to form the tubular composite well riser structure 25. It will be understood that the size and number of layers of longitudinally and circumferentially wound aramid fiber may be varied to provide the desired strength and stiffness in the well riser 25.

The preferred metal connector 28 has a generally radially stepped form to which the various layers 30,32 of fibrous material are bonded. In their preferred form, the steps 34 of the metal connector 28 have a slight reverse taper extending longitudinally away from the tubular composite portion of the well riser 25 in order to increase the strength of the connection for increased axial loading capacity. Also as illustrated in FIG. 3, the end portions of the longitudinally oriented aramid fibers 30 abut against the radially oriented faces 36 of the steps 34 whereas the circumferentially wound aramid fiber layers 32 overlay the land faces 38 of the steps 34. As previously stated, the metal connector may be provided with threads in order to engage coupling means for interconnection with various other components of the well riser 25 or may include portions which may be conveniently welded to other components.

The riser 25 is provided with both internal and external elastomeric liners 40 and 42, respectively. The liners 40,42 are provided to increase the chemical and damage resistance of the riser 25. Additionally, the external liner 42 may, in its preferred form, include an antifouling material such as particulate copper to prevent marine growth and eliminate the need for expensive periodic cleaning operations.

In forming the composite structure, several known techniques may be used but filament winding is preferred. In filament winding, the reinforcing fiber is wound onto a mandrel in a helical or circumferential pattern repeatedly to form the composite structure. The resulting structure is then cured in an oven. Filament winding machines are available to produce large composite parts. This technique is useful for the fabrication of generated shapes such as rings, cylinders, and pressure vessels, even of variable cross-section. Wet filament winding involves wetting the fibers with uncured resin before winding on the mandrel. Dry filament winding or tape winding employs "prepreg" tapes of approximately one inch width. "Prepreg" tapes or sheaths are fibers preimpregnated with uncured resin and are more expensive than fibers and resin purchased separately. Winding of dry fibers with subsequent resin injection is also possible.

The mandrels on which windings are preformed can be of varying cross-section. Integral metallic end fittings may be easily incorporated into a filament wound product. Various fiber orientations except 0° can be achieved by filament winding. Zero degrees plies may be provided as prepregs which are laid up by hand. Alternatively, a longitudinal lay-down method may be used whereby 0° fibers are laid on a mandrel while being captured by a 90° outer wrap.

While the invention has been described in the more limited aspects of a preferred embodiment thereof, other embodiments have been suggested and still others will occur to those skilled in the art upon a reading and understanding of the foregoing specification. It is intended that all such embodiments be included within the scope of this invention as limited only by the appended claims.

Having thus described our invention, we claim:

1. In a floating tension leg platform wherein a plurality of substantially vertically oriented, tensioned well risers are connected so as to be constantly in tension between a subsea template located on a sea bottom and said floating platform, the improvement which comprises each of said well risers being a lightweight composite structure of a plurality of longitudinally and circumferentially oriented first aramid fibers embedded in a resin matrix, the aramid fibers having an elastic modulus of less than about twenty million psi, said composite structure having a resulting low axial stiffness permitting sufficient elongation of said riser to accommodate variations in distance between said subsea template and said floating platform without the use of a conventional riser tensioner.

2. The improvement as set forth in claim 1 wherein said well risers are in sections and have metallic connectors disposed between said sections.

3. The improvement as set forth in claim 2 wherein said well risers are tubular in cross-section.

4. The improvement as set forth in claim 2 wherein said metallic connectors are threaded for interconnection.

5. The improvement as set forth in claim 2 wherein said metallic connectors are welded together.

6. The improvement as set forth in claim 1 wherein said longitudinally oriented aramid fibers have a low pitch angle helical lay.

7. The improvement as set forth in claim 6 wherein said circumferentially oriented aramid fibers have a lower elastic modulus than said longitudinally oriented fibers.

8. The improvement as set forth in claim 7 wherein said circumferentially oriented aramid fibers are helically wound.

9. The improvement as set forth in claim 8 wherein the composite structure comprises a plurality of alternating layers of longitudinally and circumferentially oriented aramid fibers.

10. The improvement as set forth in claim 1 wherein said resin matrix is a thermoset resin.

11. The improvement as set forth in claim 1 wherein said resin matrix is a thermoplastic resin.

12. The improvement as set forth in claim 1 wherein said composite structure includes internal and external elastomeric liners.

13. The improvement as set forth in claim 12 wherein said external elastomeric liner includes an antifouling material.

14. The improvement as set forth in claim 13 wherein said antifouling material is particulate copper.

* * * * *